April 24, 1934.  C. E. ANDERSON  1,956,263
RAKE
Filed Sept. 22, 1931
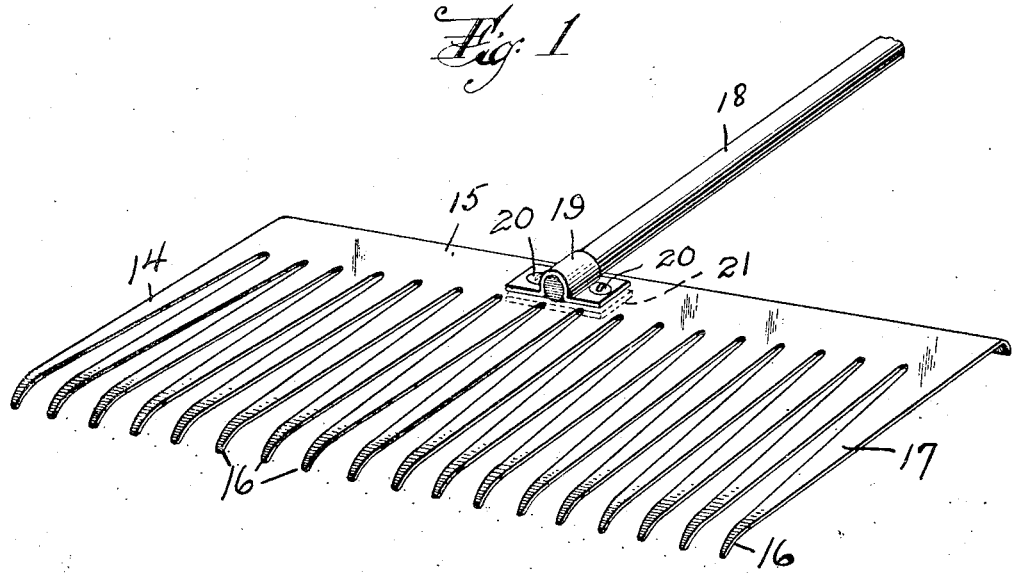
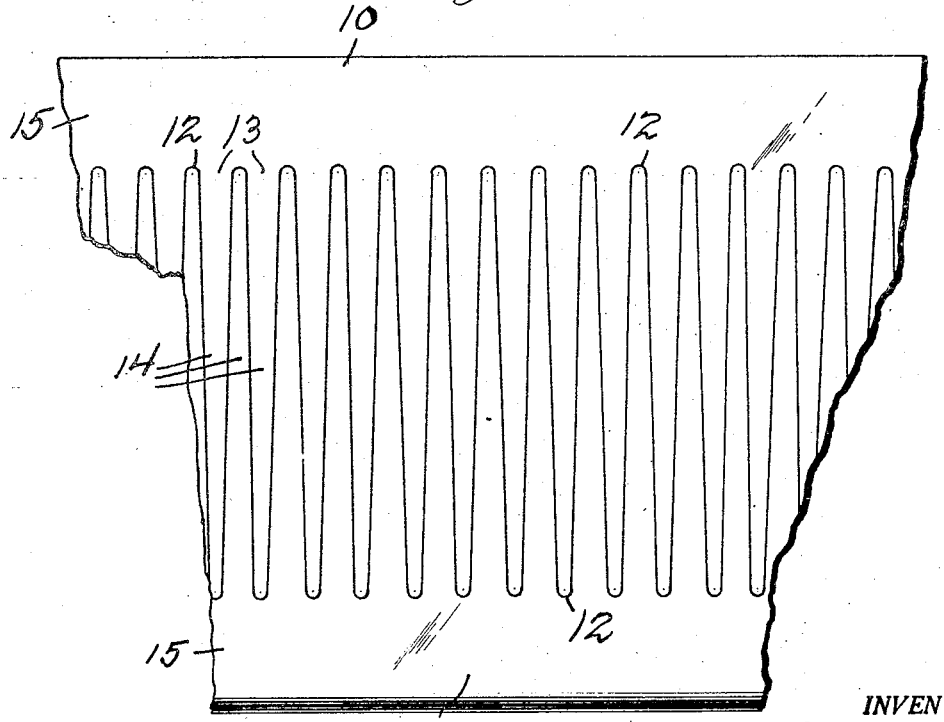
INVENTOR.
Carl E. Anderson,
BY
Wm. H. Campfield
ATTORNEY.

Patented Apr. 24, 1934

1,956,263

UNITED STATES PATENT OFFICE 1,956,263

RAKE

Carl E. Anderson, East Orange, N. J., assignor to Eastern Tool & Mfg. Co., Bloomfield, N. J.

Application September 22, 1931, Serial No. 564,336

2 Claims. (Cl. 55—10)

This invention relates to an improved rake which is made at low cost and is extremely light in weight and efficient in use.

The object of the invention is to provide a rake using few parts which reduces the cost of assembly, and one which is particularly adapted for use on lawns where damage to grass and tender plants and roots is to be avoided.

The invention is illustrated in the accompanying drawing in which Figure 1 is a perspective view of a rake embodying my invention. Figure 2 is a face view of part of a blank from which the rakes are made.

The blank 10 is cut longitudinally with a wave-like cut, these cuts having their return bends 12 narrower than the space 13 between the bends. This forms a series of teeth 14 and backs 15 when the two halves of the sheet are separated. In this way there is no waste of material. The rake so made is then subjected to bending at the ends of the teeth. These bends 16 are at the narrow free ends of the teeth and resist bending more than the major flat length of the teeth. The points 16 are therefore stiff enough to enable proper raking but the teeth spring at the intermediate part 17 and thus prevent damage to the grass.

The handle 18 is secured to the solid part 15 of the rake. I prefer to do this by means of a looped clip 19 fastened by screws 20. The stiffening plate 21 is preferably placed under the part 15 and the parts held in assembled position when the screws 20 are secured in place.

Various changes can be made in the form of the rake without departing from the scope of the invention.

I claim:—

1. A rake comprising a single sheet of spring metal formed at one edge into teeth which decrease in width toward their free ends, said free ends being curved whereby the ends are stiffened and the intermediate lengths of the teeth are the more resilient.

2. A rake comprising a sheet of spring metal with long tapered teeth, the ends of the teeth being provided with rounded points and curved at said points whereby the maximum resiliency of the teeth is in rear of the points.

CARL E. ANDERSON.